Nov. 19, 1963  R. C. ROPP  3,111,493
CADMIUM BROMOPHOSPHATE PHOSPHORS
Filed June 7, 1960
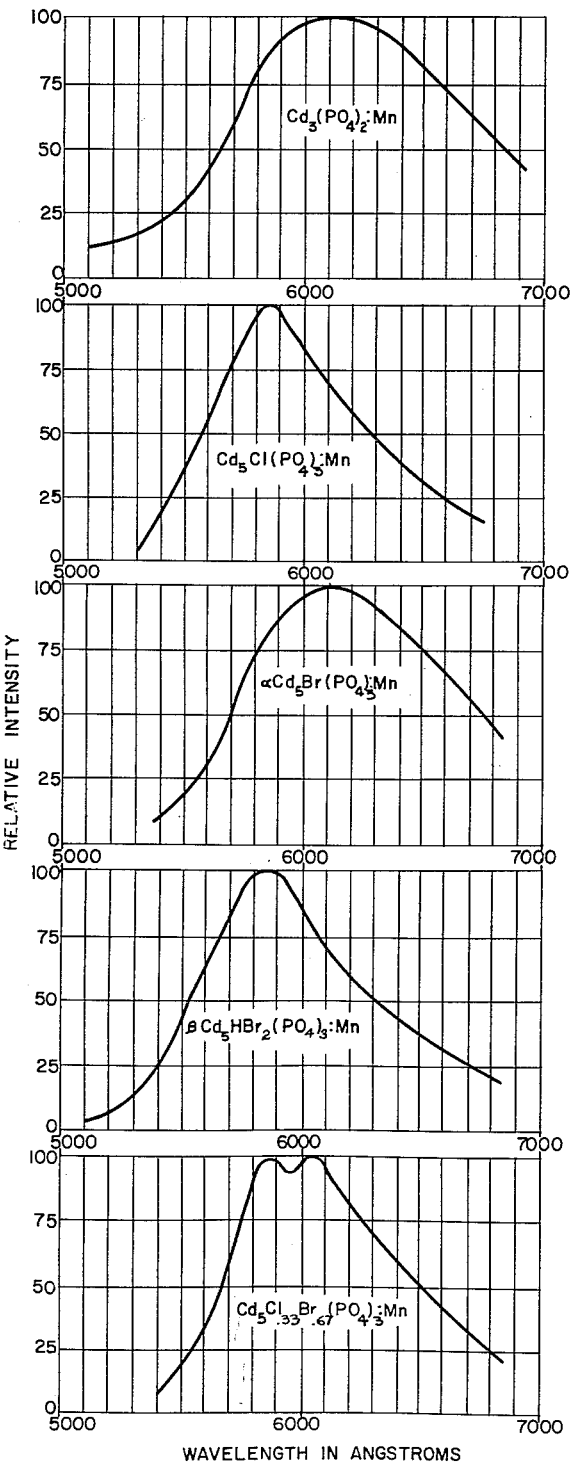
RICHARD C. ROPP
INVENTOR.
BY
ATTORNEY

United States Patent Office 3,111,493
Patented Nov. 19, 1963

3,111,493
CADMIUM BROMOPHOSPHATE PHOSPHORS
Richard C. Ropp, Towanda, Pa., assignor to Sylvania
Electric Products Inc., a corporation of Delaware
Filed June 7, 1960, Ser. No. 34,501
6 Claims. (Cl. 252—301.6)

This invention relates to phosphors which can be excited by ultraviolet irradiation, cathode rays and the like, and particularly to phosphors which can be used in fluorescent lamps. More specificaly, the invention involves cadmium bromophosphate and cadmium bromochlorophosphate phosphors activated by manganese.

It is known from the prior art that manganese-activated cadmium phosphate is a phosphor and furthermore, it is known that cadmium chlorophosphate can be activated by manganese. The U.S. patent to McKeag et al., 2,191,351, teaches such compositons. The use of lead and manganese to activate cadmium fluorophosphate has been described by Wollentin, U.S. Patent 2,780,600.

The primary object of this invention is the activation of cadmium bromophosphate by manganese to form a phosphor which can be used in electron discharge lamps.

A further object of this invention is to provide for two new crystalline forms of the manganese activated cadmium bromophosphate phosphor; namely, $\alpha$ and $\beta$ cadmium bromophosphates.

Another object of this invention is to substitute chlorine atoms for bromine in a cadmium bromophosphate phosphor.

Still another object of this invention is to describe a process for manufacturing of the above described phosphors.

Other features, objects and advantages will become apparent to those skilled in the art by the following specification with reference to the drawings.

Referring to the drawings:

FIGURE 1 is an emission spectra of the well-known manganese-activated cadmium orthophosphate phosphor.

FIGURE 2 is an emission spectra of the conventional manganese-activated cadmium chlorophosphate phosphor.

FIGURES 3 and 4 are emission spectra of the two forms of the manganese-activated cadmium bromophosphate phosphor according to my invention; namely, $\alpha$ and $\beta$ cadmium bromophosphate phosphor, the high temperature and low temperature forms, respectively.

FIGURE 5 is the emission spectra of a chloro-substituted cadmium bromophosphate phosphor. The fractional subscript numbers of the bromine and chlorine refer to the percent molar proportions of each of the halides present in the phosphor.

When cadmium ammonium phosphate hydrate, cadmium oxide, manganese ammonium phosphate and cadmium chloride are fired together in an oven, in suitable proportions and under appropriate conditions, the well-known cadmium chlorophosphate phosphor is produced. It has been discovered that if cadmium bromide is either totally or partially substituted for the cadmium chloride, cadmium bromophosphate or cadmium bromochlorophosphate phosphors are produced, depending upon the relative amounts of the cadmium bromide that are added to the raw material mixture.

In contrast to the well-known manganese-activated cadmium chlorophosphate phosphor of which but a single form is known, it has been determined that two forms of the cadmium bromophosphate exist, which are herein referred to as alpha and beta. The alpha form $$(\alpha Cd_5Br(PO_4)_3:Mn)$$

is the high temperature form and has an apatite structure similar to $Cd_5Cl(PO_4)_3:Mn$, as will be shown in Table I, but produces a different emission as shown by comparing FIGURES 2 and 3 of the drawing. The apatite structure is derived from the structure of the mineral apatite $[(CaF)Ca_4(PO_4)_3]$ and is a hexagonal crystal with a unit prism containing two molecules, and is a characteristic structure which many compounds and minerals form.

The beta form ($\beta Cd_5HBr_2(PO_4)_3:Mn$) is the low temperature form and differs from the well-known cadmium chlorophosphate in both structure and composition, but has a similar emission as will be seen by comparing FIGURES 2 and 4 of the drawings.

As will be apparent with reference to FIGURE 2 of the drawing, the prior art cadmium chlorophosphate is an orange phosphor which has an emission band peaking at 5860 A. and a 50% band spread of 920 A. The alpha form of the cadmium bromophosphate of this invention is a red phosphor and is illustrated in FIGURE 3 of the drawing. This phosphor has an emission band peaking at 6100 A. and has a 50% band spread of 870 A.

The beta form of the cadmium bromophosphate of this invention is a yellow phosphor. It has an emission band peaking at 5850 A. and a 50% band spread of 820 A.

It is apparent that materials of different compositions differ also in their color or efficiency of luminescence or in the radiations by which they are excited or in two or more of these properties. It may be observed, however, that a material of a new composition may be quite useful even if it resembled known materials in all of its properties.

The similarities and differences between the phosphors of this invention and that of the prior art will become more apparent with reference to the X-ray patterns described in Table I.

TABLE I

| Phosphor | Three most intense lines ("d" spacings) | | |
|---|---|---|---|
| | (1) | (2) | (3) |
| $Cd_3(PO_4)_2:Mn$ | 6.66 | 3.86 | 2.43 |
| $Cd_5Cl(PO_4)_3:Mn$ | 2.85 | 2.79 | 2.69 |
| $\alpha Cd_5Br(PO_4)_3:Mn$ | 2.81 | 2.86 | 2.70 |
| $\beta Cd_5HBr_2(PO_4)_3:Mn$ | 3.09 | 2.95 | 1.85 |

Noting the $\alpha Cd_5Br(PO_4)_3:Mn$ and the $Cd_5Cl(PO_4)_3:Mn$ it is apparent that the X-ray patterns differ somewhat in the intensities; however, the two are virtually identical. These forms possess the apatite structure. Noting the beta form, which differs in composition from the alpha form solely by additional bromine and hydrogen atoms, there are substantial differences in the X-ray pattern over either the alpha form of the cadmium bromophosphate or the cadmium chlorophosphate. Thus it is apparent that the beta form differs from both the chlorophosphate and the alpha bromophosphate form in its structure and composition but, as noted above, is similar to the cadmium chlorophosphate in its emission It is known that the firing temperature and the duration thereof may be varied over a wide range for the preparation of the manganese-activated cadmium chlorophosphate. On the other hand, the cadmium bromophosphate phosphors are prepared within substantially narrower limits. The alpha form may be prepared between 1200° F. and 1450° F. It decomposes above 1500° F. to form $Cd_3(PO_4)_2$:Mn. The beta form is prepared under an even more narrow range of conditions. This form may be prepared between 1050° F. and 1300° F. and at a firing time of only two to four hours. It has been determined that above these ranges the beta form decomposes to yield the alpha form upon reheating at temperatures below 1500° F. but above 1200° F.

Phosphors prepared according to this invention are tabulated in Table II and compared to a manganese-activated cadmium chlorophosphate phosphor which is set as an arbitrary standard in the plaque brightness column.

TABLE II

| Phosphor | Color | Percent Plaque Brightness |
|---|---|---|
| $Cd_5Cl(PO_4)_3$:Mn | Orange | 100 |
| $Cd_5Br(PO_4)_3$:Mn | Dull Red | 39 |
| $Cd_5HBr_2(PO_4)_3$:Mn | Yellow | 86 |

Noting now another aspect of this invention, it has been discovered that the partially chloro-substituted cadmium bromophosphate phosphors have different spectral properties than either the manganese-activated cadmium chlorophosphate phosphor or the manganese-activated cadmium bromophosphate phosphor. Table III is illustrative of data substantiating this point. The table shows the percent moles of each of the $CdCl_2$ and $CdBr_2$ added to the phosphor, together with a column showing the total moles present. The color of the various phosphors and the percent plaque brightness of these is measured against cadmium chlorophosphate which is set as an arbitrary standard.

TABLE III

| Percent Moles Added To Raw Material Mixture | | Moles Added To Raw Material Mixture | | Emission Color | Percent Plaque Brightness |
|---|---|---|---|---|---|
| $CdCl_2$ | $CdBr_2$ | $CdCl_2$ | $CdBr_2$ | | |
| 100 | ---- | .75 | ---- | yellow-orange | 100 |
| 86.7 | 13.3 | .65 | .10 | ----do---- | 89 |
| 73.3 | 26.7 | .55 | .20 | orange | 80 |
| 60 | 40 | .45 | .30 | red-orange | 90 |
| 33.3 | 66.7 | .25 | .50 | red | 96 |
| ---- | 100 | ---- | .75 | dull red | 45 |

It is to be noted that there is a change in emission color with the variation of the compound formulation. When the $CdCl_2$ is the only source of halogen in the composition the emission color is a yellow-orange. However, when the $CdBr_2$ is the only source of halogen the emission color is a dull red. Further, there is quite a substantial change in the percent plaque brightness between the two compositions. The $Cd_5Br(PO_4)_3$:Mn phosphor is relatively a dull red phosphor which is only about 40% plaque brightness. However, when the chloride is incorporated as a co-source of halogen, the resulting phosphor becomes more efficient. This increase in brightness is shown in the phosphor generally believed to have the formula $Cd_5Br_{.65}Cl_{.33}(PO_4)_3$:Mn, which is illustrated in FIGURE 5 of the drawing. Noting Table III, this phosphor has a plaque brightness of 96% and it has a red emission. Thus, it is possible to produce an efficient red phosphor having a visual emission similar to the $\alpha Cd_5Br(PO_4)_3$:Mn phosphor but with a 250% increase in intensity.

Illustrative of procedures for preparing phosphors according to this invention, the following examples are cited. These examples are cited to show preferred methods of preparation and are not intended to be limitative of the preparation of the composition.

*Example I*

[Preparation of $\alpha Cd_5Br(PO_4)_3$:Mn (Red)]

| Compound | Weight, grs. | Assay |
|---|---|---|
| $CdNH_4PO_4 \cdot H_2O$ | 500.7 | 92.6% as $CdNH_4PO_4$ |
| $CdO_2$ | 132.9 | 97.8% as $CdO_2$ |
| $MnNH_4PO_4 \cdot H_2O$ | 7.3 | 92.1% as $MnNH_4PO_4$ |
| $CdBr_2$ | 204.2 | |

The above ingredients are mixed by appropriate means such as a hammermill and then fired in an open 1000 ml. crucible for two hours at about 1460°. A red emitting phosphor is obtained having an apatite structure.

It is to be noted that by increasing the temperature of firing of this phosphor to about 1560° F. and by decreasing the time to about one and a half hours, a dull pink emitting phosphor is obtained having a $Cd_3(PO_4)_2$ structure.

*Example II*

[Preparation of $\beta Cd_5HBr_2(PO_4)_3$:Mn (Yellow)]

| Compound | Weight, grs. | Assay |
|---|---|---|
| $CdNH_4PO_4 \cdot H_2O$ | 541.0 | 92.7% as $CdNH_4PO_4$ |
| $CdO_2$ | 132.9 | 97.8% as $CdO_2$ |
| $MnNH_4PO_4 \cdot H_2O$ | 7.3 | 92.1% as $MnNH_4PO_4$ |
| $CdBr_2$ | 204.2 | |

The above ingredients are mixed as described in Example I. The mixture is then fired in an open 1000 ml. crucible at temperatures between about 1100–1150° F. for three hours. A soft, uniform, bright yellow emitting phosphor is obtained.

*Example III*

[Preparation of a manganese-activated cadmium bromochlorophosphate (Red)]

| Compound | Weight, grs. | Assay |
|---|---|---|
| $CdNH_4PO_4 \cdot H_2O$ | 1502.2 | 92.6% as $CdNH_4PO_4$ |
| $CdO_2$ | 398.7 | 97.8% as $CdO_2$ |
| $MnNH_4PO_4 \cdot H_2O$ | 21.9 | 92.1% as $MnNH_4PO_4$ |
| $CdCl_2$ | 137.5 | |
| $CdBr_2$ | 408.4 | |

The above ingredients are mixed as described in Example I. The mixture is then fired in an open 1000 ml. silica crucible for three hours at about 1200° F. a uniform red emitting phosphor is formed.

Various modifications may be made by one skilled in the art without departing from the spirit of the invention. It is my intention only to be limited in the invention by the scope of the appended claims.

I claim:

1. A manganese-activated cadmium bromophosphate phosphor.

2. A manganese-activated alpha cadmium bromophosphate phosphor having an apatite structure.

3. A manganese-activated beta cadmium bromophosphate phosphor.

4. A manganese-activated cadmium bromochlorophosphate phosphor.

5. A process of preparing manganese-activated alpha cadmium bromophosphate phosphor comprising forming a mixture of cadmium ammonium phosphate, cadmium peroxide, manganous ammonium phosphate and cadmium bromide and firing said mixture between 1200° F. and 1450° F. and recovering said manganese-activated alpha bromophosphate.

6. A process for preparing a manganese-activated beta cadmium bromophosphate phosphor comprising forming a mixture of cadmium ammonium phosphate, cadmium peroxide, manganous ammonium phosphate and cadmium bromide, firing said mixture at a temperature between 1050° F. and 1300° F. and a time between 2 and 4 hours and recovering said manganese-activated beta cadmium bromophosphate.

References Cited in the file of this patent
UNITED STATES PATENTS

| | | |
|---|---|---|
| 2,191,351 | McKeag et al. | Feb. 20, 1940 |
| 2,488,733 | McKeag et al. | Nov. 22, 1949 |